United States Patent
Wang et al.

(10) Patent No.: US 11,050,988 B2
(45) Date of Patent: Jun. 29, 2021

(54) DEVICE AND METHOD FOR SHADOW CORRECTION VERIFICATION PARAMETER DETERMINATION AND SHADOW CORRECTION VERIFICATION

(71) Applicant: Shanghai Xiaoyi Technology Co., Ltd., Shanghai (CN)

(72) Inventors: Xiaomin Wang, Shanghai (CN); Xie Wu, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 53 days.

(21) Appl. No.: 16/362,929

(22) Filed: Mar. 25, 2019

(65) Prior Publication Data

US 2019/0297310 A1    Sep. 26, 2019

(30) Foreign Application Priority Data

Mar. 26, 2018   (CN) .......................... 201810252431.5

(51) Int. Cl.
  *H04N 9/77*    (2006.01)
  *H04N 5/208*   (2006.01)
  (Continued)

(52) U.S. Cl.
  CPC .............. *H04N 9/77* (2013.01); *H04N 5/208* (2013.01); *H04N 5/217* (2013.01); *H04N 5/235* (2013.01)

(58) Field of Classification Search
  CPC ........ H04N 5/217; H04N 5/208; H04N 5/235; H04N 9/77; H04N 5/20; H04N 5/23238; H04N 5/3572; H04N 9/64
  See application file for complete search history.

(56) References Cited

U.S. PATENT DOCUMENTS

| | | | |
|---|---|---|---|
| 7,796,806 B2 * | 9/2010 | Kalevo | H04N 5/367 382/149 |
| 2004/0071343 A1 | 4/2004 | Yamazoe et al. | |

(Continued)

FOREIGN PATENT DOCUMENTS

| | | |
|---|---|---|
| CN | 101115138 A | 1/2008 |
| CN | 106506905 A | 3/2017 |

(Continued)

OTHER PUBLICATIONS

Dhane et al., A Generic Non-Linear Method for Fisheye Correction, International Journal of Computer Application, Aug. 2012, pp. 58-65 (Year: 2012).*

(Continued)

*Primary Examiner* — Said M Elnoubi
(74) *Attorney, Agent, or Firm* — Cantor Colburn LLP (57) ABSTRACT

A method for shadow correction verification parameter determination, the method comprising: obtaining correction data in each block of a plurality of correction images, the correction data comprising luma information and color information; wherein the luma information is the ratio of a luma to a luma of a center block, and the color information is a ratio of a color value to a color value of the center block; and calculating at least one set of standard values and deviation values of each block by using the luma information and the color information in each block of the plurality of correction images and taking the at least one set of standard values and deviation values to be correction verification parameters in the shadow correction verification.

23 Claims, 7 Drawing Sheets

(51) Int. Cl.
*H04N 5/217* (2011.01)
*H04N 5/235* (2006.01)

(56) References Cited

U.S. PATENT DOCUMENTS

2007/0110309 A1  5/2007  Ibrahim et al.
2008/0024629 A1  1/2008  Kotani
2019/0180428 A1* 6/2019  Iriyama .................. H04N 9/646

FOREIGN PATENT DOCUMENTS

CN      107590840 A   1/2018
EP       0967791 A1  12/1999

OTHER PUBLICATIONS

Chinese Office Action for corresponding CN Application No. 201810252431.5. dated Feb. 3, 2020.

* cited by examiner

DEVICE AND METHOD FOR SHADOW CORRECTION VERIFICATION PARAMETER DETERMINATION AND SHADOW CORRECTION VERIFICATION

The disclosure claims the benefits of priority to Chinese Application No. 201810252431.5 filed on Mar. 26, 2018, which is incorporated herein by reference in its entirety.

FIELD OF TECHNOLOGY

The present disclosure relates to the field of image processing technology, and more particularly to a shadow correction verification parameter determination and shadow correction verification method, device, storage medium, and fisheye camera.

BACKGROUND

The phenomenon of lens shading causes the brightness of a picture to be darker around its rim. With respect to panoramic cameras, lens shading results in a shaded region around stitches when stitching is performed. Therefore, correction is performed when a panoramic camera is on the production line to provide dynamic shadow compensation for each lens. The field of view (FOV) used for a fisheye lens is 220°, which is a relatively large angle. Therefore, correction needs to be performed using an integrating sphere, and it is necessary to ensure that there is no foreign object obstruction during manual or jig operation; otherwise, a section with obvious brightness abnormality will appear in the location corresponding to the foreign object.

In currently available technology, in order to ensure imaging outcome, it is necessary to verify the outcome after lens shading correction has been performed. By arranging a camera within an integrating sphere and connecting the camera to a high definition multimedia interface (HDMI) cord, a preview picture may be observed on a display screen and, by means of human eye verification, an assessment may be made on whether there is any brightness abnormality.

However, when the outcome of lens shading correction is being verified, verification performed with the human eye is time-consuming, limited, and unreliable.

SUMMARY

In accordance with embodiments of the present disclosure, there is provided a shadow correction verification parameter determination method, comprising: obtaining correction data in each block of a plurality of correction images, the correction data comprising luma information and color information; wherein the luma information is the ratio of a luma to a luma of a center block, and the color information is a ratio of a color value to a color value of the center block; and calculating at least one set of standard values and deviation values of each block by using the luma information and the color information in each block of the plurality of correction images and taking the at least one set of standard values and deviation values to be correction verification parameters in the shadow correction verification.

Also, in accordance with embodiments of the present disclosure, there is provided a method of shadow correction verification, the method comprising: obtaining correction verification parameters and an image to be verified, the correction verification parameters comprising standard values and deviation values of each block, the correction verification parameters being calculated using luma information and color information in each block of a plurality of correction images; wherein the luma information is a ratio of a luma to a luma of a center block, and the color information being a ratio of a color value to a color value of the center block; obtaining correction data to be verified in each block of the image to be verified, the correction data to be verified comprising a first ratio of an average luma value to an average luma value of the center block and a second ratio of an average color value to an average color value of the center block; comparing the first ratio and the second ratio with at least one set of standard values and deviation values to obtain a comparison result; and determining, on the basis of the comparison result, whether the correction passes the verification.

Further, in accordance with embodiments of the present disclosure, there is provided a shadow correction verification parameter determination device, comprising: a correction data obtaining module adapted to obtain correction data in each block of a plurality of correction images, the correction data comprising luma information and color information; wherein the luma information is a ratio of a luma to a luma of a center block, and a color information being a ratio of a color value to a color value of the center block; and a correction verification parameter determination module adapted to calculate at least one set of standard values and deviation values of each block by using the luma information and the color information in each block of the plurality of correction images, and to take the at least one set of standard values and deviation values to be correction verification parameters for use in shadow correction verification.

Additionally, in accordance with embodiments of the present disclosure, there is provided a shadow correction verification device, wherein the shadow correction verification device comprises: a parameter obtaining module adapted to obtain correction verification parameters and an image to be verified, the correction verification parameters comprising standard values and deviation values of each block, the correction verification parameters being calculated using luma information and color information in each block of a plurality of correction images; wherein the luma information is a ratio of a luma to a luma of a center block, and the color information being a ratio of a color value to a color value of the center block; a correction data to be verified obtaining module adapted to obtain correction data to be verified in each block of the image to be verified, the correction data to be verified comprising a first ratio of an average luma value to an average luma value of the center block and a second ratio of an average color value to an average color value of the center block; a verification module adapted to compare the first ratio and second ratio with at least one set of standard values and deviation values to obtain a comparison result; and a result determination module adapted to determine, on the basis of the comparison result, whether the correction passes the verification.

DETAILED DESCRIPTION

As stated in the Background section, when the outcome of lens shading correction is being verified, verification performed with the human eye is time-consuming, limited, and unreliable.

These and other problems are overcome by methods and devices of the present disclosure that calculate at least one set of standard values and deviation values using correction data from correction images. The standard values and deviation values may represent the color cast and luma deviation at the rim of the correction images and thus may be used to measure shadow correction outcome of an image to be verified. This technical solution may reliably eliminate imaging issues caused by foreign object obstruction or improper operation during the factory testing and correction process, thereby avoiding the time loss and unreliability associated with human eye verification and further ensuring the reliability of the verification of shadow correction results. This technical solution may also reduce the amount of time needed for verification and provide greater convenience for the shadow correction verification process.

Figure 1:
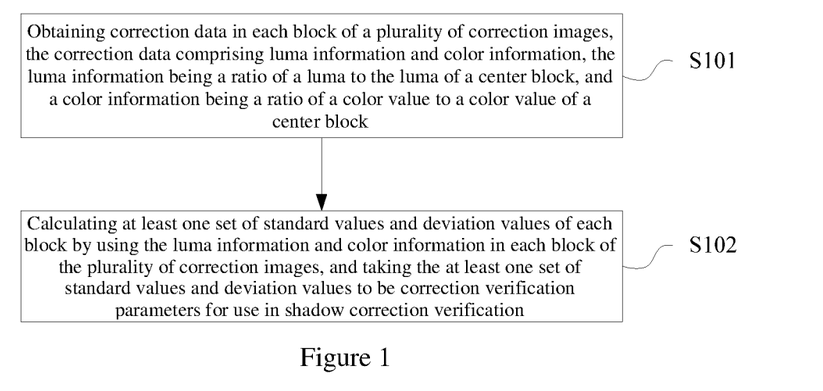
FIG. 1 is a flowchart of an exemplary method for shadow correction verification parameter determination, consistent with disclosed embodiments.

FIG. 1 is a flowchart of an exemplary method for shadow correction verification parameter determination consistent with disclosed embodiments. The shadow correction verification parameter determination method illustrated in FIG. 1 may be used on a fisheye camera. The illustrated shadow correction verification parameter determination method comprises the following steps:

At Step S101: obtaining correction data in each block of a plurality of correction images, the correction data comprising luma information and color information, the luma information being a ratio of a luma to a luma of a center block, and a color information being a ratio of a color value to the color value of the center block.

At Step S102: calculating at least one set of standard values and deviation values of each block by using the luma information and color information in each block of the plurality of correction images, and taking the at least one set of standard values and deviation values to be correction verification parameters for use in shadow correction verification. In some embodiments, at S101, the correction images may be images that have completed correction.

Figure 2:
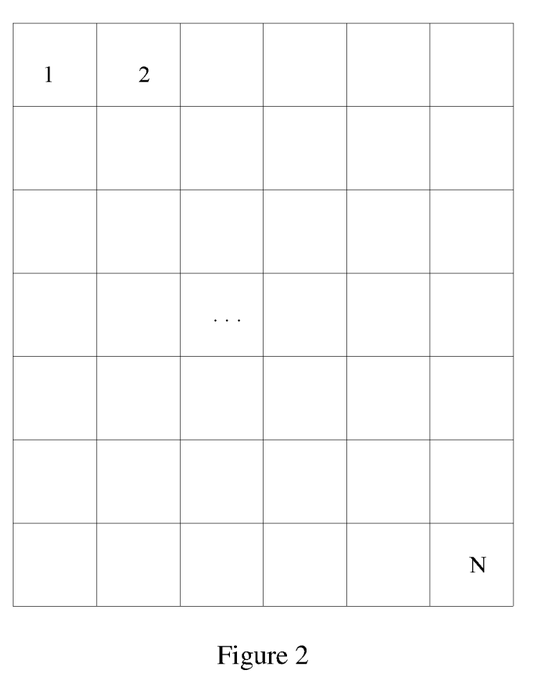
FIG. 2 is a diagram showing division of a correction image into a plurality of blocks, consistent with disclosed embodiments.

FIG. 2 is a diagram showing division of a correction image into a plurality of blocks. A plurality of correction images are divided into blocks in the same manner, i.e., the plurality of correction images have the same number of blocks, and the blocks are in the same locations. For example, the correction image illustrated in FIG. 2 is divided into 42 blocks, and the size and location of each block are fixed.

In one exemplary embodiment, a center block refers to one or a plurality of blocks located at the center of the image to be verified. The correction data in each block comprises luma information of the block and color information of the block. Specifically, considering the characteristics of imaging by a fisheye camera (i.e., the luma in the middle region is higher than the luma in the rim region), a block's luma information is the ratio of an average luma value to the average luma value of the center block, and the block's color information is the ratio of an average color value to the average color value of the center block. In other words, the correction data of a block may indicate the luma deviation and color deviation of the block.

The manner in which correction images are divided into blocks is not limited by the exemplary embodiments of the present disclosure.

In some embodiments, at Step S102, the standard values and deviation values may be calculated by using the correction data in each block of the plurality of correction images. Specifically, each block may comprise at least one set of standard values and deviation values. Each set of standard values and deviation values may form a set of value ranges that may be used to measure the correction outcome when shadow correction is performed.

Further, the correction verification parameters may comprise at least one set of standard values and deviation values of each block. Here, each block refers to each of the blocks that may be formed by dividing a correction image into blocks having different locations.

Consistent with an exemplary embodiment at least one set of standard values and deviation values are calculated using correction data from correction images. The standard values and deviation values may represent the color cast and luma deviation at the rim of the correction images and thus may be used to measure the shadow correction outcome of an image to be verified As described above, the technical solution provided by exemplary embodiments of the present disclosure reliably eliminates imaging issues caused by foreign object obstruction or improper operation during the factory testing and correction process, thereby avoiding the time loss and unreliability associated with human eye verification and further ensuring the reliability of the verification of shadow correction results. The technical solution may also reduce the amount of time needed for verification and provide greater convenience for the shadow correction verification process.

In one exemplary embodiment, the correction images are selected from images that have passed correction and a plurality of preset types of abnormally corrected images. For example, in order to ensure the comprehensiveness and application scope of shadow correction verification, when correction verification parameters are being determined, a plurality of types of correction images may be used, such as, images that have passed correction and a plurality of preset types of abnormally corrected images.

Specifically, the abnormalities of the preset types of abnormally corrected images may be selected from: a picture that has been corrected appearing brighter in a non-central area of the lens field of view (FOV) due to over-compensation in such area where a lower-luma object (e.g., a hand, a cord, etc.) entered; a picture that has been corrected appearing darker in a non-central area of the picture where a higher-luma object entered; and a picture whose brightest area and thus the final luma compensation outcome are impacted by a darker or brighter object obstructing the lens central area.

Notwithstanding the above disclosure, the present disclosure is not limited thereby. As actual application environments vary or expand, the preset types of abnormally corrected images may also include any other implementable abnormalities.

Further, the standard values and deviation values of a certain type of correction images may be calculated by using a plurality of correction images of the same type to increase calculation accuracy.

In one exemplary embodiment, a plurality of standard values and deviation values are determined using images that have passed correction and a plurality of preset types of abnormally corrected images, which may then be used to verify and determine a plurality of types of images that have been corrected.

In one exemplary embodiment, the correction verification parameters, i.e., the standard values and deviation values, may be calculated by using the luma and color of each block of correction images that have completed correction.

Figure 3:
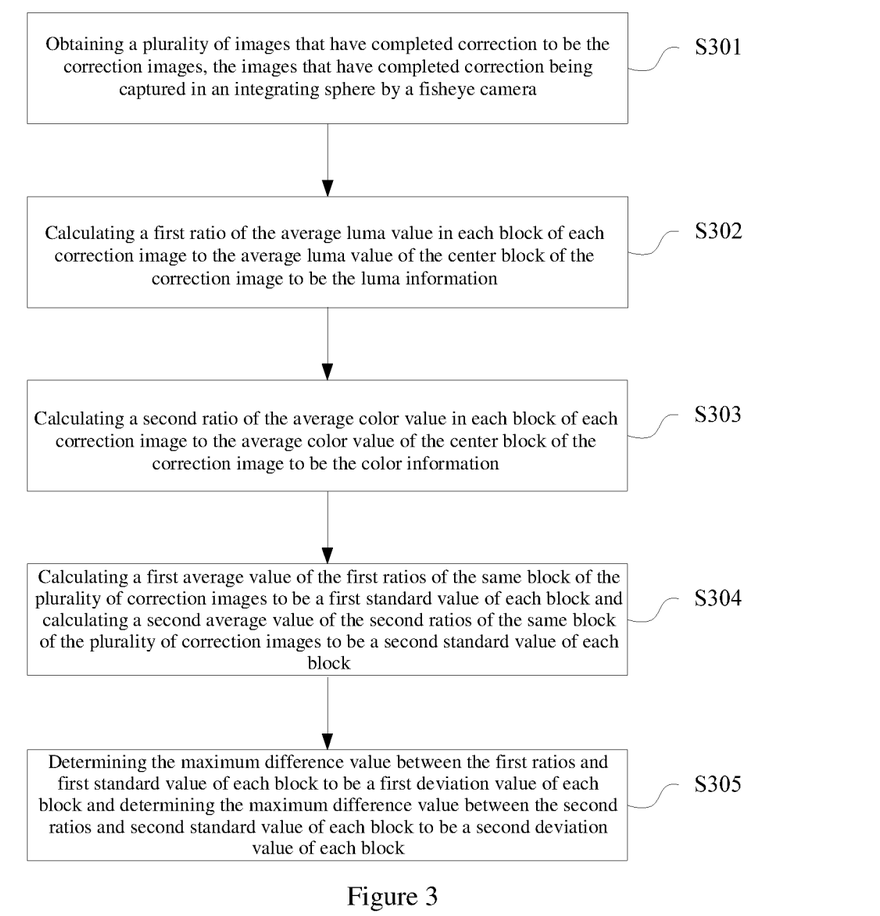
FIG. 3 is a flowchart of an exemplary method for shadow correction verification parameter determination, consistent with disclosed embodiments.

FIG. 3 is a flowchart of an exemplary method corresponding to Step S101 of FIG. 1. Referring to FIG. 3, Step S101 illustrated in FIG. 1 comprises the following steps:

At Step S301: obtaining a plurality of images that have completed correction to be the correction images, the images that have completed correction being captured in an integrating sphere by a fisheye camera.

At Step S302: calculating a first ratio of the average luma value in each block of each correction image to the average luma value of the center block of the correction image to be the luma information.

At Step S303: calculating a second ratio of the average color value in each block of each correction image to the average color value of the center block of the correction image to be the color information.

The luma information is the first ratio of the average luma value in each block to the average luma value of the center block, and the color information is the second ratio of the average color value in each block to the average color value of the center block.

Specifically, if the correction images are RGB images, then the luma information and chrominance information of each block may be obtained by performing statistics using information in the R channel, G channel, and B channel of the raw image. For example, luma L=⅓(R+G+B). It is understandable to persons having ordinary skill in the art that the RGB image may also be converted to a YUV image or a YCrCb image, etc. basis, and it is understood by persons having ordinary skill in the art that other methods may also be used for calculating the average luma information and chrominance information of each block; no redundant examples will be cited here.

Referring to FIG. 3, Step S101 illustrated in FIG. 1 further comprises the following steps:

At Step S304: calculating a first average value of the first ratios of the same block of the plurality of correction images to be a first standard value of each block and calculating a second average value of the second ratios of the same block of the plurality of correction images to be a second standard value of each block.

At Step S305: determining the maximum difference value between the first ratios and first standard value of each block to be a first deviation value of each block and determining the maximum difference value between the second ratios and second standard value of each block to be a second deviation value of each block.

In one exemplary embodiment, the standard values may comprise the first standard value with respect to luma and the second standard value with respect to color. Specifically, the first standard value of a block may be the average value of the first ratios in the block of a plurality of correction images; similarly, the second standard value of a block may be the average value of the second ratios in the block of a plurality of correction images.

Further, the deviation values may comprise the first deviation value with respect to luma and the second deviation value with respect to color. The first deviation value of a block may be the maximum difference value between the first ratios and the first standard value of the block, and the second deviation value of a block may be the maximum difference value between the second ratios and second standard value of the block. In other words, the first deviation value and the second deviation value may represent an allowable degree of deviation from the corresponding standard values (i.e., the first standard value and the second standard value).

For example, the correction verification parameters (i.e., standard values and deviation values) may be calculated by using a gain value of each block of correction images prior to the start of correction.

Figure 4:
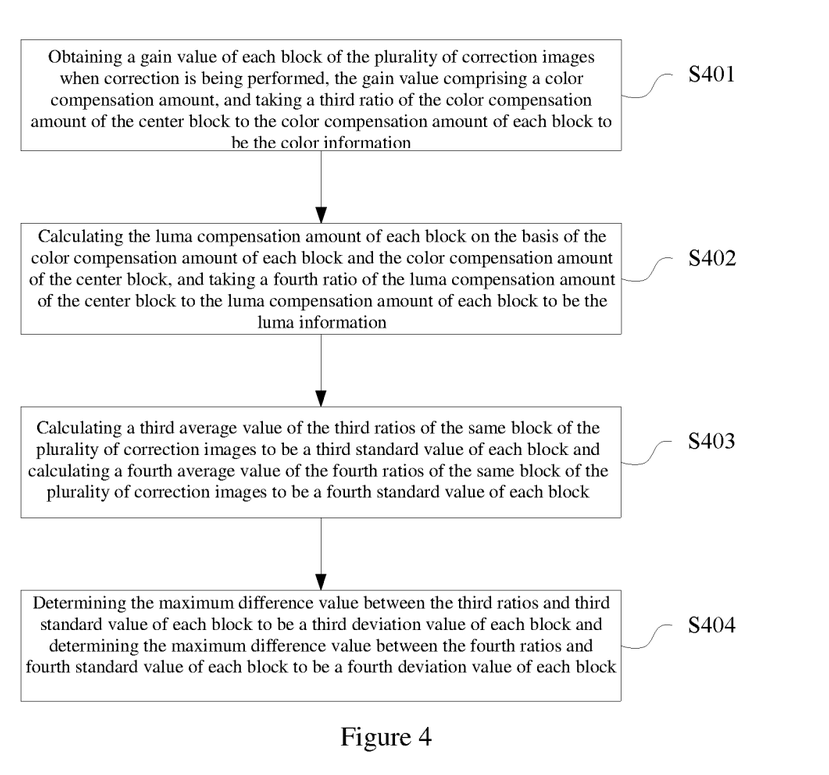
FIG. 4 is a flowchart of an exemplary method for shadow correction verification parameter determination, consistent with disclosed embodiments.

FIG. 4 is a flowchart of an exemplary method corresponding to Step S101 of FIG. 1. Referring to FIG. 4, Step S101 illustrated in FIG. 1 comprises the following steps:

At Step S401: obtaining a gain value of each block of the plurality of correction images when correction is being performed, the gain value comprising a color compensation amount, and taking a third ratio of the color compensation amount of the center block to the color compensation amount of each block to be the color information.

At Step S402: calculating the luma compensation amount of each block on the basis of the color compensation amount of each block and the color compensation amount of the center block, and taking a fourth ratio of the luma compensation amount of the center block to the luma compensation amount of each block to be the luma information.

In one exemplary embodiment, after the shadow correction has been completed, for each block there will be a corresponding gain value, which is used to perform luma and/or color compensation for each block. That is, the color in a block is compensated using the color compensation amount, and the luma in a block is compensated using the luma compensation amount.

Specifically, the color information may be the third ratio of the color compensation amount of the center block to the color compensation amount of each block, and the luma information may be the fourth ratio of the luma compensation amount of the center block to the luma compensation amount of each block.

At Step S403: calculating a third average value of the third ratios of the same block of the plurality of correction images to be a third standard value of each block and calculating a fourth average value of the fourth ratios of the same block of the plurality of correction images to be a fourth standard value of each block; and At Step S404: determining the maximum difference value between the third ratios and third standard value of each block to be a third deviation value of each block and determining the maximum difference value between the fourth ratios and fourth standard value of each block to be a fourth deviation value of each block.

In one exemplary embodiment, as described above, the third deviation value and the fourth deviation value may represent an allowable degree of deviation from the corresponding standard values (i.e., the third standard value and the fourth standard value). The third deviation value of a block may be the maximum difference value between the third ratios and the third standard value of the block, and the fourth deviation value of a block may be the maximum difference value between the fourth ratios and fourth standard value of the block.

In one exemplary embodiment, the image to be verified obtained by undergoing Step S401 is an image that has not completed correction captured by a fisheye camera, so that the impact of obstruction or operational error on the uniformity of the correction pictures can be detected, thereby ensuring the shadow correction outcome.

The correction outcome of an image captured by a fisheye camera may be verified by the correction verification parameters obtained using the method illustrated in FIG. 1.

Figure 5:
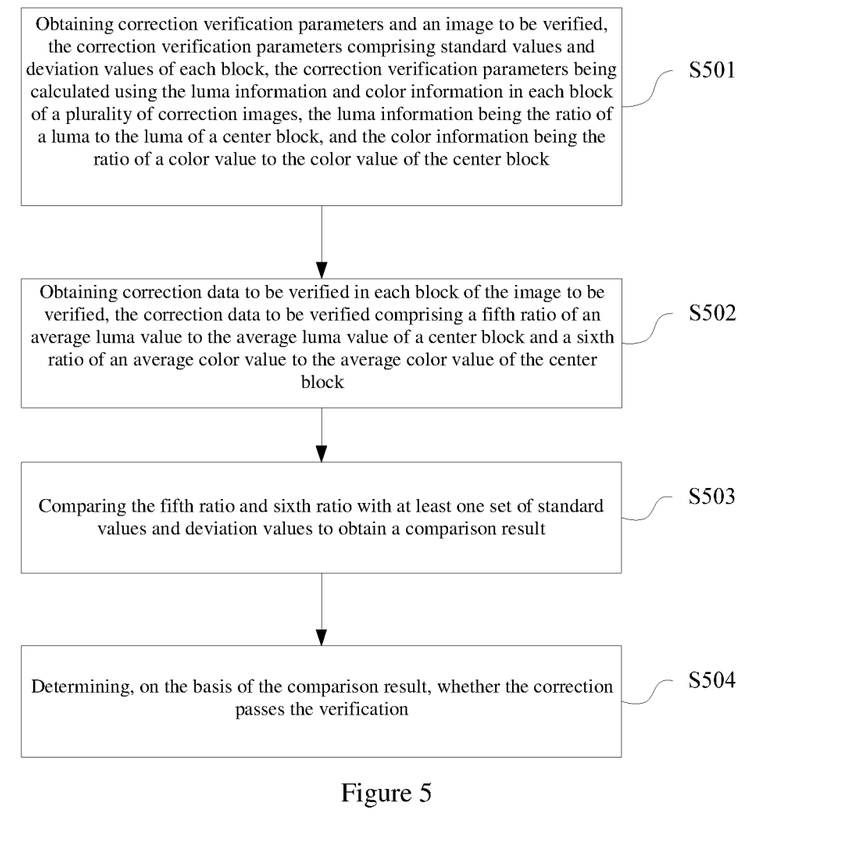
FIG. 5 is a flowchart of an exemplary method for shadow correction verification parameter determination, consistent with disclosed embodiments.

FIG. 5 illustrates an exemplary shadow correction verification parameter determination method comprising the following steps:

At Step S501: obtaining correction verification parameters and an image to be verified, the correction verification parameters comprising standard values and deviation values of each block, the correction verification parameters being calculated using the luma information and color information in each block of a plurality of correction images, the luma information being the ratio of a luma to the luma of a center block, and the color information being the ratio of a color value to the color value of the center block;

At Step S502: obtaining correction data to be verified in each block of the image to be verified, the correction data to be verified comprising a fifth ratio of an average luma value to the average luma value of a center block and a sixth ratio of an average color value to the average color value of the center block;

At Step S503: comparing the fifth ratio and sixth ratio with at least one set of standard values and deviation values to obtain a comparison result; and At Step S504: determining, on the basis of the comparison result, whether the correction passes the verification.

In one exemplary embodiment, the image to be verified, obtained by undergoing Step S501, is an image captured by a fisheye camera, the image being one that has completed correction, so that the shadow correction outcome on the image can be verified. The correction verification parameters obtained using the method illustrated in FIG. 1 may be stored on the fisheye camera. In one exemplary embodiment of Step S501, the correction verification parameters may be retrieved directly from the fisheye camera.

In one exemplary embodiment of Step S502 and Step S503, the correction data to be verified in each block of the image to be verified is obtained. The correction data to be verified may be compared with at least one set of standard values and deviation values.

Specifically, the correction data to be verified of each block is compared with at least one set of standard values and deviation values of the block. For example, referring to FIG. 2, the correction data to be verified of block 1 is compared with the standard values and deviation values of block 1. The specific process of comparing the fifth ratio and the sixth ratio with at least one set of standard values and deviation values may be: assessing whether the fifth ratio and the sixth ratio fall within a value range defined by the standard values and the deviation values.

In one exemplary embodiment of Step S504, the shadow correction of the image to be verified passes the verification if the fifth ratio and the sixth ratio fall within the value range defined by the standard values and the deviation values.

One exemplary embodiment uses the correction verification parameters to perform automatic shadow correction verification on an image to be verified, thereby avoiding the time loss and unreliability associated with human eye verification and further ensuring the reliability of the verification of shadow correction results.

In one exemplary embodiment, Step S501 may comprise the following steps: calculating the fifth ratio of the average luma value of the lumas in each block of the image to be verified to the average luma value of the center block of the image to be verified; and calculating the sixth ratio of the average color value of the colors in each block of the image to be verified to the average color value of the center block of the image to be verified.

In one exemplary embodiment, the correction data to be verified may be the fifth ratio with respect to the luma in each block of the image to be verified and the sixth ratio with respect to the color in each block of the image to be verified. Specifically, the fifth ratio may be the ratio of the average luma value of the lumas in a block to the average luma value of the center block, and the sixth ratio may be the ratio of the average color value of the colors in a block to the average color value of the center block.

In one exemplary embodiment, Step S501 may comprise the following steps: calculating a seventh ratio of the luma compensation amount of the center block of the image to be verified to the luma compensation amount of each block of the image to be verified; and calculating an eighth ratio of the color compensation amount of the center block of the image to be verified to the color compensation amount of each block of the image to be verified.

In one exemplary embodiment, the correction data to be verified may be the seventh ratio with respect to the luma compensation amount in each block of the image to be verified and the eighth ratio with respect to the color compensation amount in each block of the image to be verified. As described above, the two approaches to determine the luma information and color information of an image to be verified provide greater variety of computational approaches, further ensuring comprehensiveness and accuracy of correction outcome verification.

In one exemplary embodiment, Step S504 illustrated in FIG. 5 may comprise the following steps: if the comparison result indicates that the fifth ratio and sixth ratio fall within a value range defined by a set of standard values and deviation values, then determining, on the basis of the type of correction images corresponding to the set of standard values and deviation values, the image to be verified to have passed the correction verification or to be an abnormally corrected image of the preset type.

In one exemplary embodiment, the correction images are selected from images that have passed correction and a plurality of preset types of abnormally corrected images. Different standard values and deviation values may be obtained using different types of correction images. Thus, the type of a correction image is determined on the basis of the standard values and deviation values in which the fifth ratio and sixth ratio fall; then, the type of the image to be verified may be determined, i.e., the image to be verified is an image that has passed correction or a plurality of preset types of abnormally corrected images.

In one exemplary embodiment, a certain number of a plurality of correction images captured in an integrating sphere by a fisheye camera that has passed shadow correction are acquired, and calculations are performed on a ratio L_Corner/L_Center of the average luma values of different blocks of the correction images to the average luma values of the center blocks of the correction images and on ratios (R/G)_Corner/(R/G)_Center and (B/G)_Corner/(B/G)_Center of the average color values of the blocks to the average color values of the center blocks.

As described above, calculations are performed on the ratios of a plurality of correction images to obtain a luma distribution and a color distribution of a fisheye lens that has completed shadow correction. The average value of the luma ratios L_Corner/L_Center and the average values of the color ratios (R/G)_Corner/(R/G)_Center and (B/G)_Corner/(B/G)_Center are selected to be the standard values. The maximum difference value between the luma ratios and the corresponding standard value is calculated to be the deviation value, and the maximum difference value between the color ratios and the corresponding standard value is calculated to be the deviation value.

Moreover, various types of correction images that may present abnormalities during the shadow correction process may be acquired. For example, a picture that has been corrected appearing bright in a non-central area of the lens FOV due to overcompensation in such area where a lower-luma object (e.g., a hand, a cord, etc.) entered; or a picture that has been corrected appearing darker in a non-central area of the picture where a brighter object entered; or a picture whose brightest area and thus the final luma compensation outcome are impacted by a darker or brighter object obstructing the lens central area. Calculations are performed on the correction data of the above mentioned abnormal correction images to obtain the standard values and deviation values corresponding to the various types of abnormalities.

After completing integrating sphere correction, the fisheye camera may automatically capture an image to be verified in the integrating sphere after the correction is completed. Then, on the basis of the retrieved correction verification parameters, an analysis is performed and an assessment is made on whether the correction verification parameters fall within the value range defined by the standard values and deviation values. If they do, then the correction of the image to be verified passes the verification; if they exceed the range defined by the standard values and deviation values, then an abnormality prompt is provided on the basis of the type of correction image corresponding to the standard values.

Figure 6:
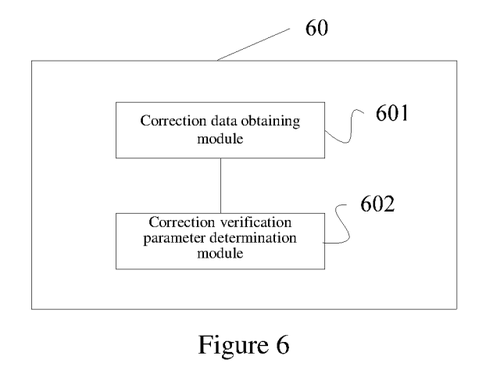
FIG. 6 is a block diagram of a shadow correction verification parameter determination device, consistent with disclosed embodiments.

Referring to FIG. 6 is a block diagram of a shadow correction verification parameter determination device 60 comprising a correction data obtaining module 601 and a correction verification parameter determination module 602.

More particularly, the correction data obtaining module 601 is adapted to obtain correction data in each block of a plurality of correction images, the correction data comprising luma information and color information, the luma information being the ratio of a luma to the luma of a center block, and the color information being the ratio of a color value to the color value of the center block; and Further, the correction verification parameter determination module 602 is adapted to calculate at least one set of standard values and deviation values of each block by using the luma information and color information in each block of the plurality of correction images, and to take the at least one set of standard values and deviation values to be correction verification parameters for use in shadow correction verification.

One exemplary embodiment calculates at least one set of standard values and deviation values using correction data from correction images. The standard values and deviation values represent the color cast and luma deviation at the rim of the correction images and are used to measure the shadow correction outcome of an image to be verified. This technical solution may reliably eliminate imaging issues caused by foreign object obstruction or improper operation during the factory testing and correction process, thereby avoiding the time loss and unreliability associated with human eye verification and further ensuring the reliability of the verification of shadow correction results. This technical solution may also reduce the amount of time needed for verification and provide greater convenience for the shadow correction verification process.

In one exemplary embodiment, the correction data obtaining module 601 may comprise a correction image obtaining unit (not shown in the figure) adapted to obtain a plurality of images that have completed correction to be the correction images, the images that have completed correction being captured in an integrating sphere by a fisheye camera. Further, the correction data obtaining module 601 may comprise a first luma information calculating unit (not shown in the figure) adapted to calculate a first ratio of the average luma value in each block of each correction image to the average luma value of the center block of the correction image to be the luma information. Additionally, the correction data obtaining module 601 may comprise a first color information calculating unit (not shown in the figure) adapted to calculate a second ratio of the average color value in each block of each correction image to the average color value of the center block of the correction image to be the color information.

In one exemplary embodiment, the correction verification parameter determination module 602 may comprise a first standard value calculating unit (not shown in the figure) adapted to calculate a first average value of the first ratios of the same block of the plurality of correction images to be a first standard value of each block and to calculate a second average value of the second ratios of the same block of the plurality of correction images to be a second standard value of each block. Further, the correction verification parameter determination module 602 may comprise a first deviation value calculating unit (not shown in the figure) adapted to determine the maximum difference value between the first ratios and first standard value of each block to be a first deviation value of each block and to determine the maximum difference value between the second ratios and second standard value of each block to be a second deviation value of each block.

In one exemplary embodiment, the correction data obtaining module 601 may comprise a second color information calculating unit adapted to obtain a gain value of each block of the plurality of correction images when correction is being performed, the gain value comprising a color compensation amount, and to take a third ratio of the color compensation amount of the center block to the color compensation amount of each block to be the color information. The correction data obtaining module 601 may further comprise a second luma information calculating unit adapted to calculate, on the basis of the color compensation amount of each block and the color compensation amount of the center block, a fourth ratio of the luma compensation amount of the center block to the luma compensation amount of each block to be the luma information.

Further, the correction data obtaining module 601 may comprise a second standard value calculating unit adapted to calculate a third average value of the third ratios of the same block of the plurality of correction images to be a third standard value of each block and to calculate a fourth average value of the fourth ratios of the same block of the plurality of correction images to be a fourth standard value of each block. The correction data obtaining module 601 may further comprise a second deviation value calculating unit adapted to determine the maximum difference value between the third ratios and third standard value of each block to be a third deviation value of each block and to determine the maximum difference value between the fourth ratios and fourth standard value of each block to be a fourth deviation value of each block.

Please refer to the relevant descriptions in FIGS. 1-5 above for more information on the principles and ways of operation of the shadow correction verification parameter determination device 60.

Figure 7:
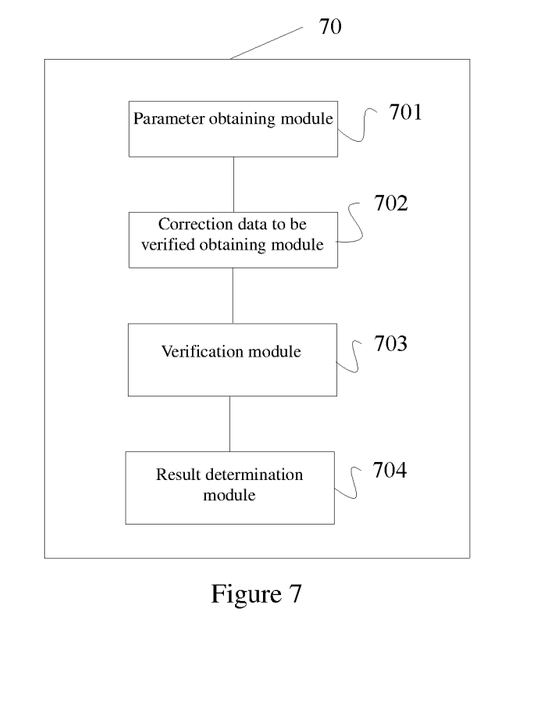
FIG. 7 is a block diagram of a shadow correction verification device, consistent with disclosed embodiments.

FIG. 7 is a block diagram of a shadow correction verification device 70 comprising a parameter obtaining module 701, a correction data to be verified obtaining module 702, a verification module 703, and a result determination module 704. Here, the parameter obtaining module 701 is adapted to obtain correction verification parameters and an image to be verified. The correction verification parameters comprise standard values and deviation values of each block. The correction verification parameters are calculated using the luma information and color information in each block of a plurality of correction images, the luma information being the ratio of a luma to the luma of a center block, and the color information being the ratio of a color value to the color value of the center block.

The correction data to be verified obtaining module 702 is adapted to obtain correction data to be verified in each block of the image to be verified. The correction data to be verified comprises a fifth ratio of an average luma value to the average luma value of a center block and a sixth ratio of an average color value to the average color value of the center block. The verification module 703 is adapted to compare the fifth ratio and sixth ratio with at least one set of standard values and deviation values to obtain a comparison result. The result determination module 704 is adapted to determine, on the basis of the comparison result, whether the correction passes the verification.

One exemplary embodiment uses the correction verification parameters to perform automatic shadow correction verification on an image to be verified, thereby avoiding the time loss and unreliability associated with human eye verification and further ensuring the reliability of the verification of shadow correction results.

In one exemplary embodiment, the correction data to be verified obtaining module 702 may comprise a first luma ratio calculating unit (not shown in the figure) adapted to calculate a fifth ratio of the average luma value of the lumas in each block of the image to be verified to the average luma value of the center block of the image to be verified. Further, the correction data to be verified obtaining module 702 may comprise a second color ratio calculating unit (not shown in the figure) adapted to calculate a sixth ratio of the average color value of the colors in each block of the image to be verified to the average color value of the center block of the image to be verified.

More particularly, the correction images are selected from images that have completed correction and a plurality of preset types of abnormally corrected images. The result determination module 704 determines, when the comparison result indicates that the fifth ratio and sixth ratio fall within a value range defined by a set of standard values and deviation values and on the basis of the type of correction images corresponding to the set of standard values and deviation values, the image to be verified to have passed the correction verification or to be an abnormally corrected image of the preset type.

In one exemplary embodiment, the correction data to be verified obtaining module 702 may comprise a second luma ratio calculating unit (not shown in the figure) adapted to calculate a seventh ratio of the luma compensation amount of the center block of the image to be verified to the luma compensation amount of each block of the image to be verified. Further, the correction data to be verified obtaining module 702 may comprise a second color ratio calculating unit (not shown in the figure) adapted to calculate an eighth ratio of the color compensation amount of the center block of the image to be verified to the color compensation amount of each block of the image to be verified.

More particularly, the correction images are selected from images prior to the start of correction and a plurality of preset types of abnormally corrected images. The result determination module 704 determines, when the comparison result indicates that the seventh ratio and eighth ratio fall within a value range defined by a set of standard values and deviation values and on the basis of the type of correction images corresponding to the set of standard values and deviation values, the image to be verified to have passed the correction verification or to be an abnormally corrected image of the preset type.

Please refer to the example embodiments above for more details about the theory, specific implementation, and benefits of the shadow correction verification device 70.

Some embodiments of the present disclosure further provide a storage device, storing computer instructions, which, when executed by a processor cause the processor to perform methods consistent with those described above with respect to FIGS. 1-5. For example, the storage medium may comprise a computer-readable storage medium such as a non-volatile storage device or a non-transitory storage device. The computer-readable storage medium may comprise a ROM, a RAM, a magnetic disk, or an optical disc, etc.

Some embodiments of the present disclosure further provide a computing device that includes a storage device and a processor; the storage device storing computer instructions, which, when executed by a processor cause the processor to perform methods consistent with those described above with respect to FIGS. 1-5.

The present disclosure is not limited by the specific embodiments herein. Any person having ordinary skill in the art may make various alterations and changes that are not detached from the essence and scope of the present disclosure; therefore, the scope of protection for the present invention should be that as defined by the claims.

The invention claimed is:

1. A method for shadow correction verification parameter determination, the method comprising:
   obtaining correction data in each block of a plurality of correction images, the correction data comprising luma information and color information of the block;
   wherein the luma information is the ratio of a luma of the block to a luma of a center block, and the color information is a ratio of a color value of the block to a color value of the center block; and
   calculating at least one set of standard values and deviation values of each block by using the luma information and the color information in each block of the plurality of correction images and taking the at least one set of standard values and deviation values to be correction verification parameters in the shadow correction verification,
   wherein the obtaining correction data in each block of a plurality of correction images comprises:

obtaining a plurality of images that have completed correction to be the correction images, the images that have completed correction being captured in an integrating sphere by a fisheye camera;

calculating a first ratio of an average luma value in each block of each correction image to an average luma value of the center block of the correction image to be the luma information; and calculating a second ratio of an average color value in each block of each correction image to an average color value of the center block of the correction image to be the color information, wherein calculating standard values and deviation values of each block by using the luma information and color information in each block of the plurality of correction images comprises:

calculating a first average value of the first ratios of the same block of the plurality of correction images to be a first standard value of each block and calculating a second average value of the second ratios of the same block of the plurality of correction images to be a second standard value of each block; and determining a maximum difference value between the first ratios and the first standard value of each block to be a first deviation value of each block and determining a maximum difference value between the second ratios and the second standard value of each block to be a second deviation value of each block.

2. The method of claim 1, wherein the correction images are selected from images that have passed correction and a plurality of preset types of abnormally corrected images.

3. A non-transitory storage medium storing instructions which, when executed by a processor, cause the processor to perform the method for shadow correction verification parameter determination method of claim 1.

4. A fisheye camera comprising non-transitory computer-readable medium storing instructions which, when executed by a processor, cause the processor to perform the method for the shadow correction verification parameter determination method of claim 1.

5. A method for shadow correction verification parameter determination, the method comprising:

obtaining correction data in each block of a plurality of correction images, the correction data comprising luma information and color information of the block;

wherein the luma information is the ratio of a luma of the block to a luma of a center block, and the color information is a ratio of a color value of the block to a color value of the center block; and calculating at least one set of standard values and deviation values of each block by using the luma information and the color information in each block of the plurality of correction images and taking the at least one set of standard values and deviation values to be correction verification parameters in the shadow correction verification, wherein the obtaining correction data in each block of a plurality of correction images comprises:

obtaining a gain value of each block of the plurality of correction images when correction is being performed, the gain value comprising a color compensation amount, and taking a first ratio of the color compensation amount of the center block to the color compensation amount of each block to be the color information; and calculating a luma compensation amount of each block on the basis of the color compensation amount of each block and the color compensation amount of the center block, and taking a second ratio of the luma compensation amount of the center block to the luma compensation amount of each block to be the luma information, wherein the calculating standard values and deviation values of each block by using the luma information and the color information in each block of the plurality of correction images comprises:

calculating a first average value of the first ratios of the same block of the plurality of correction images to be a first standard value of each block and calculating a second average value of the second ratios of the same block of the plurality of correction images to be a second standard value of each block; and determining a maximum difference value between the first ratios and first standard value of each block to be a first deviation value of each block and determining a maximum difference value between the second ratios and second standard value of each block to be a second deviation value of each block.

6. The method of claim 5, wherein the correction images are selected from images prior to the start of correction and a plurality of preset types of abnormally corrected images.

7. A non-transitory storage medium storing instructions which, when executed by a processor, cause the processor to perform the method for shadow correction verification parameter determination method of claim 5.

8. A fisheye camera comprising non-transitory computer-readable medium storing instructions which, when executed by a processor, cause the processor to perform the method for the shadow correction verification parameter determination method of claim 5.

9. A method of shadow correction verification, the method comprising:

obtaining correction verification parameters and an image to be verified, the correction verification parameters comprising standard values and deviation values of each block, the correction verification parameters being calculated using luma information and color information in each block of a plurality of correction images;

wherein the luma information is a ratio of a luma to a luma of a center block, and the color information being a ratio of a color value to a color value of the center block;

obtaining correction data to be verified in each block of the image to be verified, the correction data to be verified comprising a first ratio of an average luma value to an average luma value of the center block and a second ratio of an average color value to an average color value of the center block;

comparing the first ratio and the second ratio with at least one set of standard values and deviation values to obtain a comparison result; and determining, on the basis of the comparison result, whether the correction passes the verification.

10. The method of claim 9, wherein the obtaining correction data to be verified in each block of the image to be verified comprises:

calculating the first ratio of the average luma value of the lumas in each block of the image to be verified to the average luma value of the center block of the image to be verified; and calculating the second ratio of the average color value of the colors in each block of the image to be verified to the average color value of the center block of the image to be verified.

11. The method of claim 9, wherein the obtaining correction data to be verified in each block of the image to be verified comprises:
calculating a third ratio of a luma compensation amount of the center block of the image to be verified to a luma compensation amount of each block of the image to be verified; and
calculating a fourth ratio of a color compensation amount of the center block of the image to be verified to a color compensation amount of each block of the image to be verified.

12. The method of claim 9, wherein the correction images are selected from images that have passed correction and a plurality of preset types of abnormally corrected images and the determination on the basis of the comparison result, whether the correction passes the verification comprises:
determining, on the basis of the type of correction images corresponding to the set of standard values and deviation values, the image to be verified to have passed the correction verification or to be an abnormally corrected image of the preset type, if the comparison result indicates that the first ratio and second ratio fall within a value range defined by a set of standard values and deviation values.

13. The method of claim 11, wherein the correction images are selected from images prior to the start of correction and a plurality of preset types of abnormally corrected images; and the determination, on the basis of the comparison result, whether the correction passes the verification comprises:
determining, on the basis of the type of correction images corresponding to the set of standard values and deviation values, the image to be verified to have passed the correction verification or to be an abnormally corrected image of the preset type, if the comparison result indicates that the third ratio and fourth ratio fall within a value range defined by a set of standard values and deviation values.

14. A non-transitory storage medium storing instructions which, when executed by a processor, cause the processor to perform the method for shadow correction verification parameter determination method of claim 9.

15. A fisheye camera comprising non-transitory computer-readable medium storing instructions which, when executed by a processor, cause the processor to perform the method for the shadow correction verification parameter determination method of claim 9.

16. A shadow correction verification parameter determination device, comprising:
a correction data obtaining circuitry adapted to obtain correction data in each block of a plurality of correction images, the correction data comprising luma information and color information of the block;
wherein the luma information is a ratio of a luma of the block to a luma of a center block, and a color information being a ratio of a color value of the block to a color value of the center block; and
a correction verification parameter determination circuitry adapted to calculate at least one set of standard values and deviation values of each block by using the luma information and the color information in each block of the plurality of correction images, and to take the at least one set of standard values and deviation values to be correction verification parameters for use in shadow correction verification,
wherein the correction data obtaining circuitry comprises:
a correction image obtaining sub-circuitry adapted to obtain a plurality of images that have completed correction to be the correction images, the images that have completed correction being captured in an integrating sphere by a fisheye camera;
a first luma information calculating sub-circuitry adapted to calculate a first ratio of an average luma value in each block of each correction image to an average luma value of the center block of the correction image to be the luma information; and
a first color information calculating sub-circuitry adapted to calculate a second ratio of an average color value in each block of each correction image to an average color value of the center block of the correction image to be the color information,
wherein the correction verification parameter determination circuitry comprises:
a first standard value calculating sub-circuitry adapted to calculate a first average value of the first ratios of the same block of the plurality of correction images to be a first standard value of each block and to calculate a second average value of the second ratios of the same block of the plurality of correction images to be a second standard value of each block; and
a first deviation value calculating sub-circuitry adapted to determine a maximum difference value between the first ratios and first standard value of each block to be a first deviation value of each block and to determine the maximum difference value between the second ratios and second standard value of each block to be a second deviation value of each block.

17. The shadow correction verification parameter determination device of claim 16, wherein the correction images are selected from images that have passed correction and a plurality of preset types of abnormally corrected images.

18. A shadow correction verification parameter determination device, comprising:
a correction data obtaining circuitry adapted to obtain correction data in each block of a plurality of correction images, the correction data comprising luma information and color information of the block;
wherein the luma information is a ratio of a luma of the block to a luma of a center block, and a color information being a ratio of a color value of the block to a color value of the center block; and
a correction verification parameter determination circuitry adapted to calculate at least one set of standard values and deviation values of each block by using the luma information and the color information in each block of the plurality of correction images, and to take the at least one set of standard values and deviation values to be correction verification parameters for use in shadow correction verification,
wherein the correction data obtaining circuitry comprises:
a second color information calculating sub-circuitry adapted to obtain a gain value of each block of the plurality of correction images when correction is being performed, the gain value comprising a color compensation amount, and to obtain a first ratio of the color compensation amount of the center block to the color compensation amount of each block to be the color information; and a second luma information calculating sub-circuitry adapted to calculate the luma compensation amount of each block on the basis of the color compensation amount of each block and the color compensation amount of the center block, and to obtain a second ratio of the luma compensation amount of the center block to the luma compensation amount of each block to be the luma information, wherein the correction verification parameter determination circuitry comprises:
- a second standard value calculating sub-circuitry adapted to calculate a first average value of the first ratios of the same block of the plurality of correction images to be a first standard value of each block and to calculate a second average value of the second ratios of the same block of the plurality of correction images to be a second standard value of each block; and
- a second deviation value calculating sub-circuitry adapted to determine a maximum difference value between the first ratios and first standard value of each block to be a first deviation value of each block and to determine a maximum difference value between the second ratios and second standard value of each block to be a second deviation value of each block.

19. The shadow correction verification parameter determination device of claim 18, wherein the correction images are selected from images prior to the start of correction and a plurality of preset types of abnormally corrected images.

20. A shadow correction verification device, wherein the shadow correction verification device comprises:
- a parameter obtaining circuitry adapted to obtain correction verification parameters and an image to be verified, the correction verification parameters comprising standard values and deviation values of each block, the correction verification parameters being calculated using luma information and color information in each block of a plurality of correction images;
  - wherein the luma information is a ratio of a luma to a luma of a center block, and the color information being a ratio of a color value to a color value of the center block;
- a correction data to be verified obtaining circuitry adapted to obtain correction data to be verified in each block of the image to be verified, the correction data to be verified comprising a first ratio of an average luma value to an average luma value of the center block and a second ratio of an average color value to an average color value of the center block;
- a verification circuitry adapted to compare the first ratio and second ratio with at least one set of standard values and deviation values to obtain a comparison result; and
- a result determination circuitry adapted to determine, on the basis of the comparison result, whether the correction passes the verification.

21. The shadow correction verification device of claim 20, wherein the correction data to be verified obtaining circuitry comprises:
- a first luma ratio calculating sub-circuitry adapted to calculate the first ratio of the average luma value of the lumas in each block of the image to be verified to the average luma value of the center block of the image to be verified; and
- a first color ratio calculating sub-circuitry adapted to calculate the second ratio of the average color value of the colors in each block of the image to be verified to the average color value of the center block of the image to be verified.

22. The shadow correction verification device of claim 20, wherein the correction data to be verified obtaining circuitry comprises:
- a second luma ratio calculating sub-circuitry adapted to calculate a third ratio of the luma compensation amount of the center block of the image to be verified to the luma compensation amount of each block of the image to be verified; and
- a second color ratio calculating sub-circuitry adapted to calculate an fourth ratio of the color compensation amount of the center block of the image to be verified to the color compensation amount of each block of the image to be verified.

23. The shadow correction verification device of claim 20, wherein the correction images are selected from images that have passed correction and a plurality of preset types of abnormally corrected images; and the result determination circuitry determines the image to be verified to have passed the correction verification or to be an abnormally corrected image of the preset type, when the comparison result indicates that the first ratio and second ratio fall within a value range defined by a set of standard values and deviation values and on the basis of the type of correction images corresponding to the set of standard values and deviation values.

* * * * *